(12) United States Patent
Lagergren

(10) Patent No.: US 7,905,143 B2
(45) Date of Patent: Mar. 15, 2011

(54) ULTRASONIC FUEL LEVEL MONITORING SYSTEM INCORPORATING AN ACOUSTIC LENS

(75) Inventor: Peter Lagergren, Glen Rose, TX (US)

(73) Assignee: Schmitt Measurement Systems, Inc., Portland, OR (US)

( * ) Notice: Subject to any disclaimer, the term of this patent is extended or adjusted under 35 U.S.C. 154(b) by 421 days.

(21) Appl. No.: 11/880,671

(22) Filed: Jul. 23, 2007

(65) Prior Publication Data

US 2009/0025474 A1 Jan. 29, 2009

(51) Int. Cl.
*G01F 23/00* (2006.01)
(52) U.S. Cl. ....................................... 73/290 V
(58) Field of Classification Search .................. 73/290 V
See application file for complete search history.

(56) References Cited

U.S. PATENT DOCUMENTS

| | | | |
|---|---|---|---|
| 3,687,219 A * | 8/1972 | Langlois | 181/176 |
| 3,985,030 A | 10/1976 | Charlton | 73/290 |
| 4,320,659 A * | 3/1982 | Lynnworth et al. | 73/589 |
| 4,815,323 A | 3/1989 | Ellinger et al. | 73/290 |
| 4,853,694 A | 8/1989 | Tomecek | 340/621 |
| 4,868,797 A | 9/1989 | Soltz | 367/98 |
| 4,901,245 A | 2/1990 | Olson et al. | 364/509 |
| 5,131,271 A | 7/1992 | Haynes et al. | 73/290 |
| 5,150,334 A | 9/1992 | Crosby | 367/98 |
| 5,195,058 A | 3/1993 | Simon | 367/87 |
| 5,235,553 A * | 8/1993 | Garlick et al. | 367/7 |
| 5,261,274 A | 11/1993 | Nemirow | 73/149 |
| 5,319,973 A | 6/1994 | Crayton et al. | 73/290 |
| 5,335,545 A | 8/1994 | Leszczynski | 73/602 |
| 5,511,041 A | 4/1996 | Michalski | 367/99 |
| 5,563,478 A | 10/1996 | Suganuma | 318/116 |
| 5,586,085 A | 12/1996 | Lichte | |
| 5,644,299 A | 7/1997 | Cruickshank | 340/617 |
| 5,697,248 A | 12/1997 | Brown | 73/290 V |
| 5,755,136 A | 5/1998 | Getman et al. | 73/290 V |
| 5,778,726 A | 7/1998 | Müller et al. | 73/290 |
| 5,866,815 A | 2/1999 | Schwald et al. | 73/290 |
| 5,991,234 A | 11/1999 | Sejalon et al. | 367/13 |
| 6,053,041 A | 4/2000 | Sinha | |
| 6,317,029 B1 | 11/2001 | Fleeter | 340/10.32 |

(Continued)

FOREIGN PATENT DOCUMENTS

WO WO 2009/014790 A1 1/2009

OTHER PUBLICATIONS

Office Action for U.S. Appl. No. 11/131,434, filed May 16, 2005, from USPTO mailed Nov. 17, 2006, 5 pgs.

(Continued)

*Primary Examiner* — Hezron Williams
*Assistant Examiner* — Nathaniel Kolb
(74) *Attorney, Agent, or Firm* — John R. Thompson; Stoel Rives LLP

(57) ABSTRACT

An ultrasonic liquid level monitoring system includes an ultrasonic transducer unit that is mountable to a tank. The unit has an emitter to generate an ultrasonic beam passing through the wall of the tank. The emitter further receives an echo of the ultrasonic beam off a liquid surface. An acoustic lens is disposed between the emitter and the tank wall to receive and shape the ultrasonic beam to compensate for lensing effects of the tank wall.

12 Claims, 16 Drawing Sheets

U.S. PATENT DOCUMENTS

| | | | |
|---|---|---|---|
| 6,396,819 B1 | 5/2002 | Fleeter et al. | 370/320 |
| 6,397,656 B1 | 6/2002 | Yamaguchi et al. | 73/1.82 |
| 6,412,344 B1* | 7/2002 | Danicich et al. | 73/290 V |
| 6,481,627 B1 | 11/2002 | Guerreri | 235/472.01 |
| 7,245,059 B2 | 7/2007 | Lagergren et al. | 310/317 |
| 7,287,425 B2 | 10/2007 | Lagergren | 73/290 V |
| 2004/0173021 A1 | 9/2004 | Lizon et al. | |
| 2005/0192727 A1 | 9/2005 | Shostak et al. | 701/37 |
| 2005/0284218 A1* | 12/2005 | Lagergren | 73/290 V |
| 2005/0289021 A1 | 12/2005 | Lagergren | 705/28 |
| 2006/0144139 A1 | 7/2006 | Miyagawa | 73/290 V |
| 2006/0169056 A1* | 8/2006 | Dockendorff et al. | 73/861.23 |
| 2006/0236766 A1* | 10/2006 | Quirch et al. | 73/587 |
| 2007/0080609 A1 | 4/2007 | Johnson et al. | |
| 2007/0084283 A1 | 4/2007 | Carlson et al. | |
| 2008/0208060 A1 | 8/2008 | Murkin | |

OTHER PUBLICATIONS

Office Action for U.S. Appl. No. 11/131,435, filed May 16, 2005, from USPTO mailed Nov. 21, 2006, 5 pgs.
International Search Report for PCT/US08/62603 filed May 5, 2008, and mailed Aug. 7, 2008, 2 pgs.
Written Opinion of the International Searching Authority for PCT/US08/62603 filed May 5, 2008, and mailed Aug. 7, 2008, 7 pgs.
International Search Report (5 pgs.) and Written Opinion (7 pgs.), PCT/US2010/028586, filed Mar. 25, 2010, mailed Oct. 28, 2010, 35 pgs.

* cited by examiner

ULTRASONIC FUEL LEVEL MONITORING SYSTEM INCORPORATING AN ACOUSTIC LENS

TECHNICAL FIELD

The present disclosure relates to ultrasonic measurement systems for sensing a fuel level in a liquid fuel tank.

BACKGROUND

Sensing a liquid level contained in a tank may be performed utilizing sonic measurement techniques. Typically, sonic or ultrasonic measurements are performed with the use of a piezoelectric crystal. If a liquid level is known and the geometry of a tank is known, then the liquid volume in the tank can be calculated based upon the measured level. However, when the liquid in question is propane and the tank in question is a propane tank, problems arise.

One problem is the adequacy of acoustic coupling between the ultrasonic transducer and the fuel tank. If the coupling is poor, then it may not be possible to obtain a measurement, or any measurement made may be unreliable. Another problem is that dispersion of the transmitted ultrasonic beam may reduce the available reflected energy so much that it is difficult or impossible to obtain a valid reading. Dominating any solution to such problems is the question of cost. A solution which enables direct measurement, but which requires a costly installation on each fuel tank of each customer, is an impractical solution.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the invention's scope, the embodiments will be described and explained with specificity and detail in reference to the accompanying drawings in which:

DETAILED DESCRIPTION OF PREFERRED EMBODIMENTS

Figure 1:
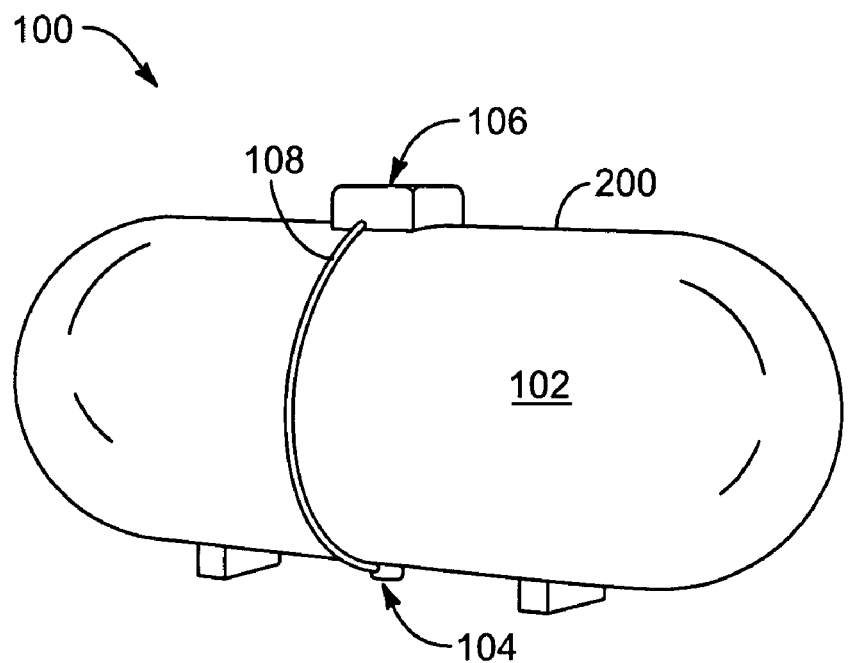
FIG. 1 is a perspective view of an embodiment of an ultrasonic fuel level monitoring system mounted to a propane fuel tank.

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the invention, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Disclosed herein is an ultrasonic fuel level monitoring system for sensing the liquid level in a liquid fuel tank. The system includes an ultrasonic transducer unit externally mountable on a tank and a control unit in electrical communication with the transducer unit. Where the tank is a propane tank, the control unit may be mounted atop the tank and is connected to the transducer unit by an electrical cable. Alternatively, the transducer may be mounted to the top of the tank and perhaps collocated with the control unit.

The transducer unit comprises a piezoelectric crystal ("piezo") transducer, a piezo driver circuit, and may also include a temperature sensor. In response to command signals from the control unit, the piezo driver circuit causes the piezo to transmit pulse trains having a controlled pulse frequency. The transducer unit may further include an acoustic lens which comprises a shaped metallic disc. The acoustic lens is disposed between the piezo and a tank wall. The acoustic lens may be bonded to the tank wall by an acoustic coupling agent. Pulse trains originating from the piezo pass through the lens, the coupling agent, and the wall. The piezo further listens for return echoes from the liquid surface in the tank. Echo return signal information is sent to the control unit from the transducer unit.

The process of transmitting ultrasonic pulse trains into a fuel tank and listening for return echoes is referred to herein as "pinging" the tank. As is well understood by those skilled in the art, the time that it takes for a transmitted signal to reach the liquid surface and to be echoed back (viz. time-of-flight) will correspond to the liquid level. With knowledge of the tank geometry, a measurement of the fuel volume in the tank can then be calculated. In one example, a propane tank may have greater than a 10,000-gallon capacity. Propane tanks are typically horizontally mounted, right circular cylinders with a radius between 41" and 60" and have either hemispherical or ellipsoidal end caps.

The temperature sensor may be useful because, as is well understood by those skilled in the art, tank geometry will vary with increasing or decreasing temperatures. Thus, the time-of-flight measured at one temperature may be the same as the time-of-flight measured at another temperature. Yet, the actual volume of fuel in the tank at the two temperatures may differ. With knowledge of the temperature and tank geometry as a function of temperature, a more accurate measurement of volume of fuel in the tank can be calculated at any given temperature. When the transducer unit includes a temperature sensor, a signal corresponding to temperature is sent back to the control unit from the transducer unit.

The tank wall acts as a lens when sound waves are passed from the exterior of the tank, through the tank wall, and into the entrained space in the tank. This lensing effect provides a certain amount of beam collimation/dispersion that is dependent on the radius of the tank wall, the diameter of the piezo element, and the shape of any intervening acoustically transparent media. This beam collimation/dispersion of the ultrasonic beam formed by the piezo element is potentially reduced in effectiveness by either the unwanted narrowing of the beam, or the beam is reduced in effective power due to the unwanted divergence of the beam.

In the case of inappropriate beam collimation, the beam can be sufficiently narrow so that any misalignment of the transducer element from the exact perpendicular line from the bottom dead center of the tank to the liquid surface can cause the loss of measurable echo. In this case, the first reflected ultrasonic packet does not impact the area of the inner tank bottom where the piezo element is located on the exterior tank wall. This prevents the transducer unit from sensing the arrival of the return beam. Instead, the packet is reflected back to the surface of the liquid from the inner tank wall. Because the inner tank wall is a spherical acoustic reflector, the second, third, or fourth reflections from the liquid surface may return exactly to the transmission point on the inner surface of the tank.

In this case, the measured power of the second arrival of the ultrasonic beam at the piezo is sufficient to cause the transducer unit to measure the second arrival as the "correct" time-of-flight of the ultrasonic packet from the piezo to the surface of the liquid and return to the piezo. This effect causes an incorrect reading of the measured distance. The use of successively larger piezo elements aggravates this problem in that the beam angle of an ultrasonic packet transmitted by a larger diameter piezo decreases in proportion to the diameter of the piezo. This is a serious problem in that the use of a larger diameter piezo is indicated where a higher ultrasonic flux is required. This may be due to longer range requirements or thicker tank walls, but this also means that beam alignment becomes substantially more difficult.

These difficulties are overcome by introducing an acoustic lens that effectively shapes the ultrasonic beam into an advantageous pattern. This allows the use of larger diameter piezo elements and, thus, longer-range measurements without the inherent disadvantages. This provides a more robust solution to the problem of alignment of an external sensor in that the controlling shaping of the beam makes the installation much more tolerant of misalignment.

It is well known in the art to use an externally mounted ultrasonic transducer mounted to the bottom of a tank, the surface of which is in intimate contact with the liquid of the tank. However, it is substantially more difficult to transmit ultrasound through the top of the tank and then through the gas phase above the liquid and then sense and time the echo from the gas/liquid interface. The relatively higher losses of acoustic energy while transiting the gas phase can be mitigated by shaping of the transmitted beam into a more compact and, thus, higher cross-sectional acoustical energy density. The higher cross-sectional area energy density increases the likelihood of detection of the reflected beam. Thus, practical application of a top-mounted transducer unit is realized.

Referring to FIG. 1, an ultrasonic fuel level monitoring system 100 is shown for sensing the liquid level in a tank 102. The system 100 includes an ultrasonic transducer unit 104 that is externally mounted to the bottom of the tank 102. The system 100 includes a control unit 106 that is in electrical communication with the transducer unit 104 through an electrical cable 108. The electrical cable 108 may be configured to provide a synchronous serial data link. The transducer unit 104 transmits ultrasonic signals through the tank wall and listens for return echoes from the liquid surface (not shown) in the tank. The control unit 106 directs the operation of the transducer unit 104 and collects time-of-flight date and temperature date from the transducer unit 104.

Figure 2:
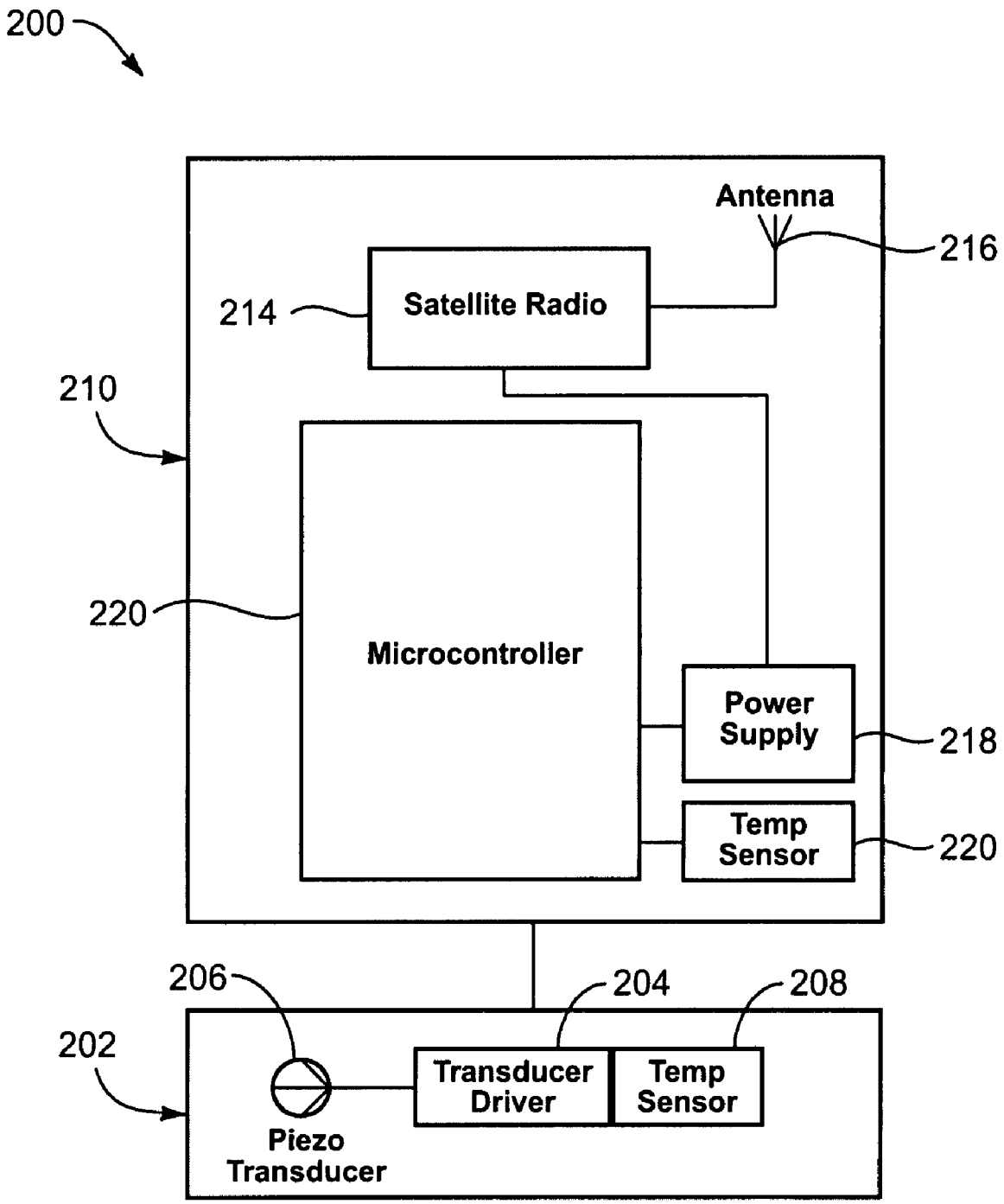
FIG. 2 is a block diagram of an embodiment of a monitoring system.

Referring to FIG. 2, a block diagram of an ultrasonic fuel level monitoring system 200 is shown. The system 200 includes a transducer unit 202 comprising a transducer driver 204, an emitter 206 to emit an ultrasonic beam, and a temperature sensor 208. The emitter 206 may be embodied as a piezoelectric crystal transducer or piezo 206. When excited, the piezo 206 emits an ultrasonic beam. Increasing the piezo diameter increases the transmission power, as power increases with the square of the piezo radius. Increasing the piezo diameter narrows the hemispherical beam. A narrower beam has more power-per-unit area and is more likely to receive an echo. The temperature sensor 208 is used to obtain a measurement of the tank temperature, which is desirable in order to adjust readings taken for accuracy (e.g., within plus or minus 2%).

A control unit 210 is in electrical communication with the transducer unit 202 and may comprise a low power microprocessor or microcontroller 212. The microcontroller 212 is in electrical communication with a satellite radio 214, an antenna 216, a battery power supply 218, and an ambient temperature sensor 220. To minimize size and cost, the satellite radio 214 may be a simplex radio capable of transmitting but not receiving.

Figure 3:
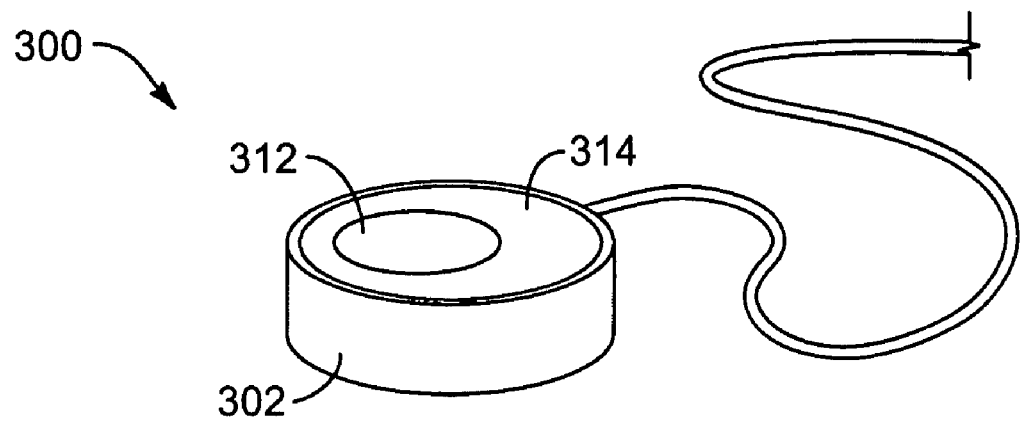
FIG. 3 is a perspective view illustrating an embodiment of a transducer unit that forms part of a monitoring system.
Figure 4:
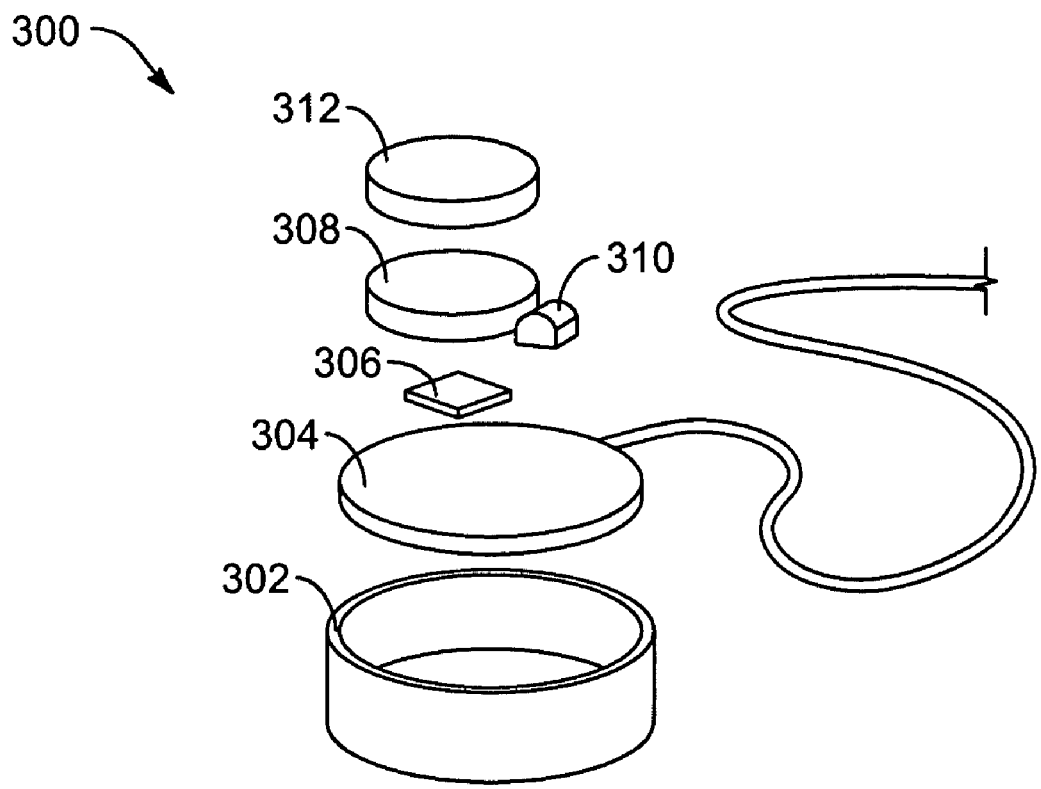
FIG. 4 is an exploded view of the transducer unit of FIG. 4.

Referring to FIGS. 3 and 4, an embodiment of a transducer unit 300 is shown. The transducer unit 300 may include a housing 302 and a printed circuit board (PCB) 304 containing transducer circuitry. The transducer circuitry may be mounted to the bottom of the board. A foam pad cushion 306 may be set on top of the PCB 304. On top of the foam pad cushion 306, an emitter 308, such as a piezo 308, rests and is in electrical communication with the PCB 304. A temperature sensor 310 may be disposed and mounted atop the PCB 304. An acoustic lens 312 is disposed directly atop the piezo 308. The acoustic lens 312 may be bonded to the piezo 308 through use of an epoxy agent. In one embodiment, the components are secured within the housing 302 by use of a potting compound 314. The upper surface of the acoustic lens 312 may be initially exposed for bonding with an outer tank wall by use of a bonding agent.

Figure 5:
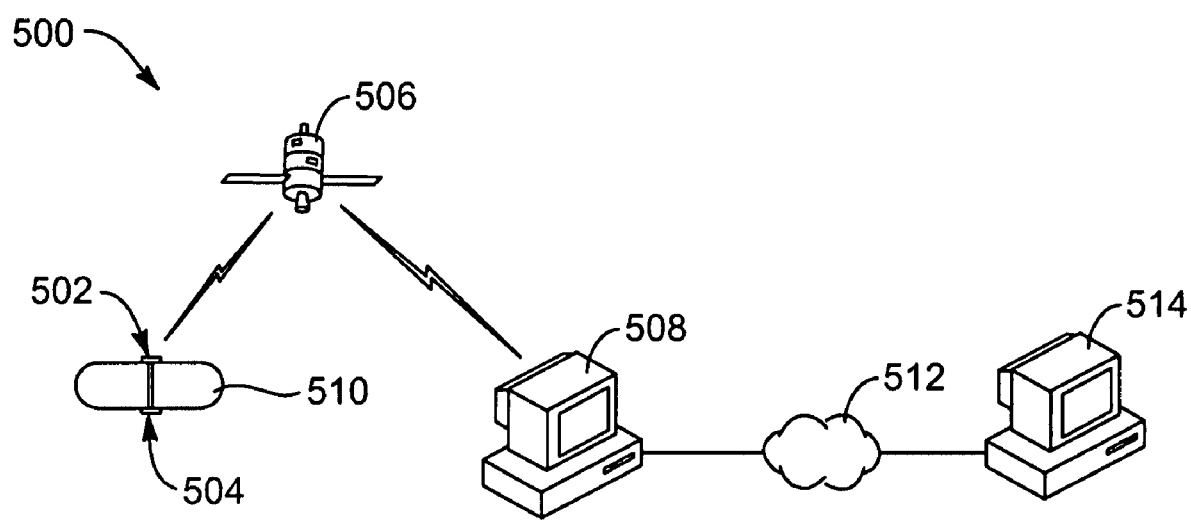
FIG. 5 illustrates a working environment of a propane tank and a monitoring system.

Referring to FIG. 5, a working environment 500 is shown wherein data collected by a control unit 502 from a transducer unit 504, including time-of-flight and temperature data, is transmitted by radio from control unit 502 via a satellite data link 506 to a computer 508. Computer 508 includes a computer readable storage medium which receives the data input and, together with previously stored information on tank geometry and dimensions and a suitable computer program product, processes the received data to calculate a measure of the fuel volume in the tank 510. The calculated measure may also be stored in the storage medium and may be read out and displayed by computer 508. The computer 508 may be in electrical communication with a network 512, such as a LAN, WAN, or the internet. Through the network 512, the calculated measure may be read out and displayed on a second computer 514.

The transducer unit 504 may be silent and un-powered during all phases of operation except when a tank reading is requested. Control unit 502 may be timed to wake up at intervals (e.g., every 16 seconds) to determine the time of day, and to compare that time with a sensing and transmission schedule programmed in a microcontroller. If the system is not scheduled to either "ping" the tank 510 or to transmit measurement information via satellite radio, then the control unit 502 may go back to sleep.

When the transducer unit 504 wakes up, it may be programmed to listen for a set of commands sent to it by the control unit 502. A ping may be generated by a microcontroller command from control unit 502. A pulse train of pulses is then switched into the piezo to generate the transmitted ultrasonic packet. As the piezo begins to oscillate, it transmits the ultrasonic ping packet into the acoustic lens. From the acoustic lens, the ultrasonic wave packet transits a region of acoustic coupling agent, such as a water-based gel, a silicon rubber, or some other form of acoustically transparent medium. The ultrasonic wave packet then transits the tank wall and enters the liquid or gas phase of the product in the tank. The ultrasonic packet has a wave front shaped by acoustic lens, the tank wall, and the differences in the velocity of sound of the media through which the pulse is traveling.

Figure 6:
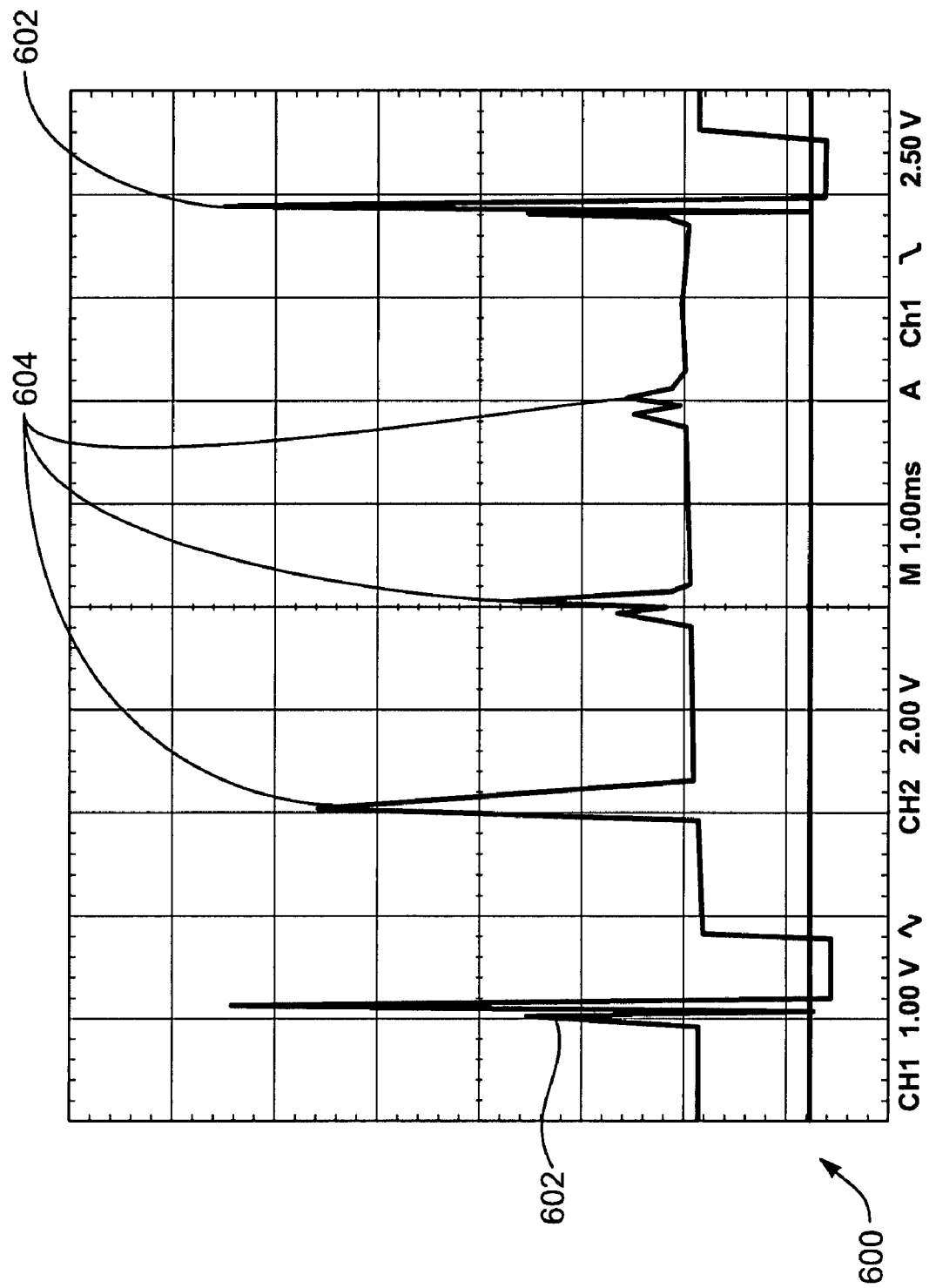
FIG. 6 illustrates a waveform of an ultrasonic signal and associated echoes.

Referring to FIG. 6, a graphical representation of a waveform 600 of a pulse 602 and corresponding echoes 604 is shown. The pulse 602 is emitted into the tank and may be reflected from the liquid surface. The tank wall acts as a hemispherical lens at ultrasonic frequencies. The echo re-impinges on the piezo and produces a detectable signal. In some instances, there are multiple received echoes as reflections from the liquid surface and the inner tank wall occur. In an ideal case, the energy in each of these multiple echoes is exponentially less than the preceding echo. In FIG. 6, the echoes 604 illustrate an exponential decay.

Figure 7:
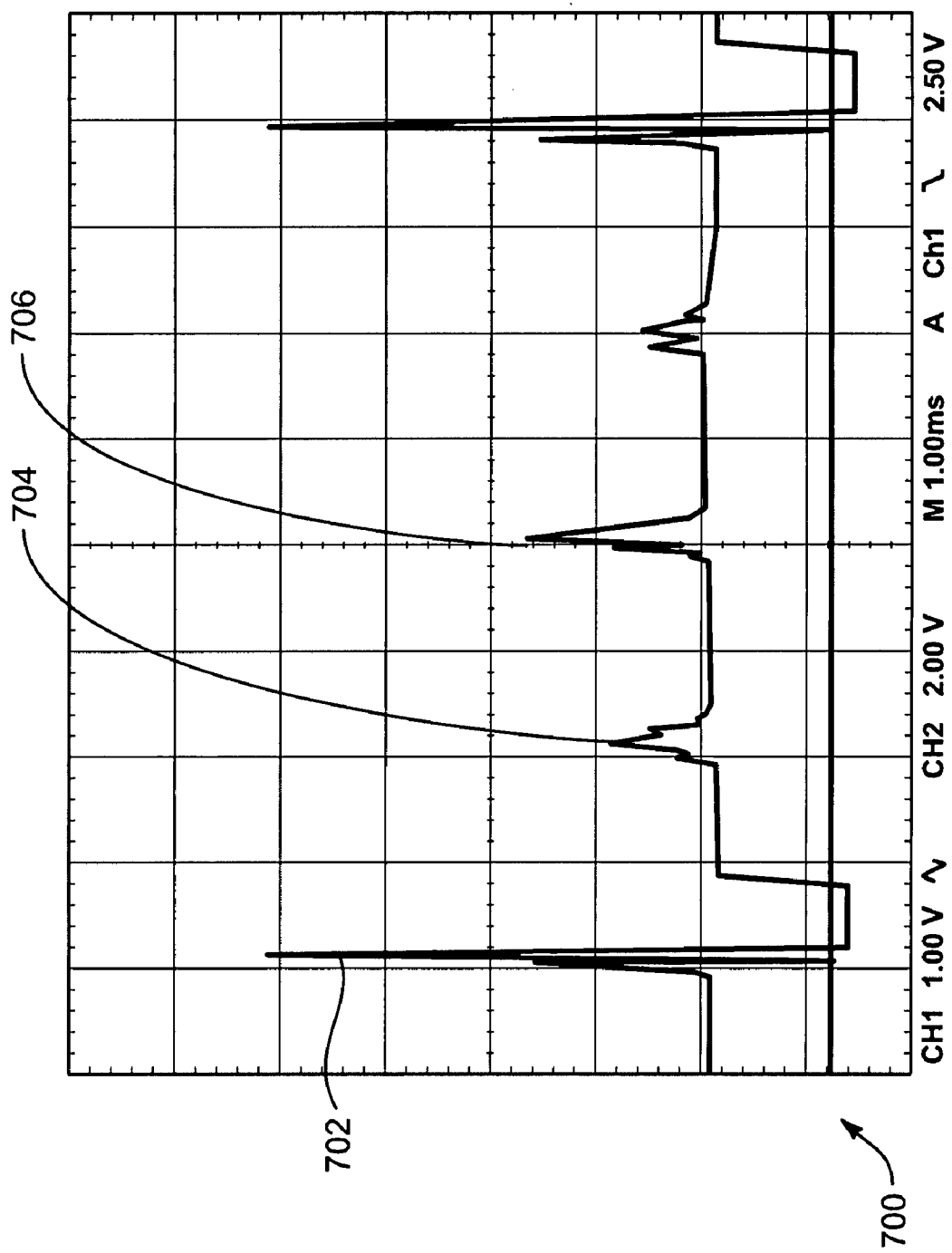
FIG. 7 illustrates a waveform of an ultrasonic signal and associated echoes in a doubling event.

Referring to FIG. 7, a graphical representation of a waveform 700 that is experiencing doubling is shown. Doubling occurs when an ultrasonic emitter, such as the piezo, is mounted off the exact perpendicular from the liquid surface to the bottom of the tank. This offset causes a pulse to reflect from the liquid surface at a slight divergence. The echo strikes the inner tank wall outside the active area of the emitter. This leads to a reduced received signal.

The echo is then reflected back to the liquid surface and is again reflected to the emitter. The second echo is at a higher amplitude than the first echo because the second echo is received within the active area of the emitter. This causes the receiver to mistake the second echo for the actual distance. As can be appreciated, the second echo has a time-of-flight significantly greater than the first echo. In FIG. 7, the initial pulse 702 is shown. The first echo 704 is not well received and has a significantly reduced signal than the first echo in FIG. 6. The second echo 706 is well received and has a greater amplitude than the first echo 704.

Figure 8:
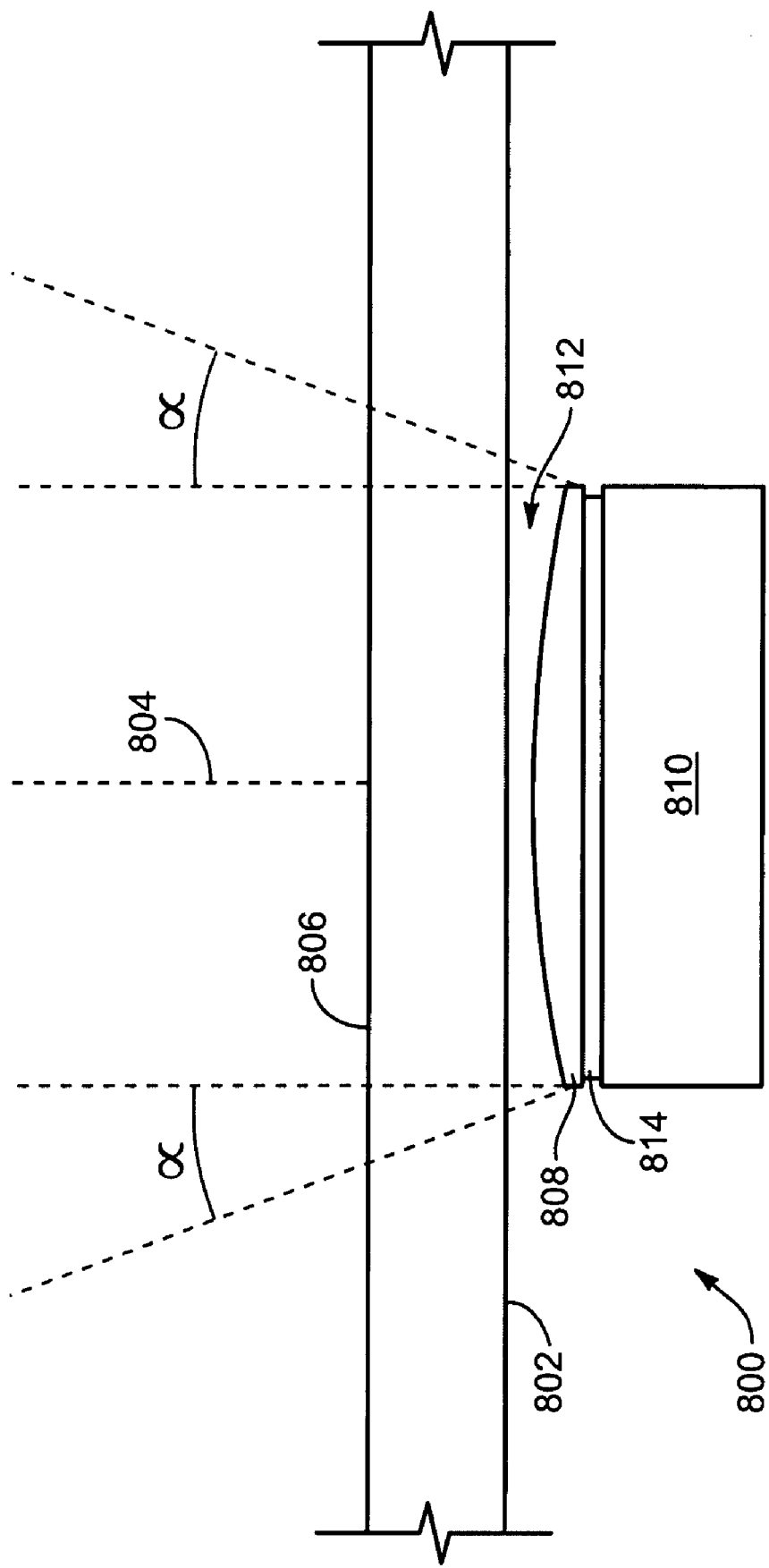
FIG. 8 illustrates a cross-sectional view of a transducer incorporating an acoustic lens.

Referring to FIG. 8, a cross-sectional view of a transducer unit 800 mounted to a tank wall 802 is shown. A Bottom Dead Center (BDC) on a large tank may be found within approximately +/−one degree of a tank centerline 804. In some cases, the inner wall 806 is not a smooth surface that is parallel to the outer tank wall. This may be due to construction anomalies, such as wrinkles from cold rolling steel, etc., which effectively moves the BDC. If the transducer 800 is mounted with an offset from the actual BDC, there is a highly increased chance of doubling.

The tank wall 802 may act as a lens to distort and misdirect a generated ultrasonic beam. Accordingly, a corrective lens may be installed in the beam path to compensate for misdirection. An acoustic lens 808 is shown disposed between an emitter 810, such as a piezo, and the tank wall 802. The acoustic lens 808 may comprise a variety of materials, such as metal, and more specifically, steel or aluminum. The acoustic lens may also comprise plastic. The acoustic lens 808 may be formed with a circular, rectangular, and square-shaped surface area and be convex or concave. The emitter 810 may have less surface area than the acoustic lens 808. As the emitter 810 moves to generate the ultrasonic beam, the acoustic lens 808 moves as well.

The acoustic lens 808 may be secured to the tank wall 802 with a bonding material 812. The bonding material 812 may comprise silicon and further acts to shape and delay an ultrasonic beam. The silicon may be without fillers, although some silicon with fillers may be acceptable. The acoustic lens 808 may be secured to the emitter 810 through another bonding material 814, such as a bonding epoxy agent. In one embodiment, the bonding material 814 may be applied with a thickness ranging from approximately 0.001 inches to approximately 0.005 inches. The bonding material 814 should be applied with a uniform thickness. In installation, the acoustic lens 808 may be heated prior to bonding to eliminate any absorbed water.

The acoustic lens 808 acts to shape the ultrasonic beam into a desired shape and to control dispersion of the beam's wavefront. The acoustic lens 808 may be embodied as a divergent lens. A divergent lens compensates for the tank wall and may also diverge the ultrasonic beam and thereby increase the size of the ultrasonic beam. In so doing, the acoustic lens 808 substantially reduces the onset of doubling. A divergent lens is defined as any acoustic lens that creates a divergent ultrasonic beam with the lensing effects of the tank wall taken into account. A divergent lens may also create an ultrasonic beam with little or no divergence. Thus, an isolated convergent acoustic lens, when used in conjunction with a tank wall, may be defined herein as a divergent lens.

An increased ultrasonic beam reduces the need for exact centering of the emitter 810 on the perpendicular. A desired measurement area for echoes may increase from +/−½ inches, or less, with a flat disc to +/−two inches from BDC with an acoustic lens 808. Thus, the proper measurement area for the return signal is quadrupled. This greatly facilitates correct installation of a transducer 800.

The divergent acoustic lens 808 may have a divergence of 0 to 5 degrees. Where the divergence is zero degrees, the acoustic lens 808 compensates for curvature in the tank wall 802, but does not create a beam divergence. In FIG. 8, divergence angles $\alpha$ result from the beam divergence created by the acoustic lens 808. If the divergence angles $\alpha$ are approximately one degree, then the acoustic lens 808 is defined as having a 2-degree divergence. For a divergence range of 0 to 5 degrees, the divergence angles $\alpha$ range from approximately 0 to 2.5 degrees. As discussed above, the increased size of the divergent beam facilitates measurements of an echo and reduces the likelihood of doubling. Thus, even with some misalignment, a first echo may be properly measured.

One of skill in the art will appreciate that the divergence may be increased as desired. A consequence of a diverging beam is that the ultrasonic flux density is reduced in the echo.

Nevertheless, it is anticipated that in many applications, the ultrasonic flux density of an echo will be sufficient for measurement.

The acoustic lens 808 may also be configured as a convergent lens to minimize the dispersion of the ultrasonic flux density after the ultrasonic beam exits the tank wall 802. A convergent lens is defined herein as an acoustic lens that converges the ultrasonic beam taking the effects of the tank wall into account. Where it is desired to reduce the lensing effect of the tank wall 802, the acoustic lens 808 is shaped with a radius the same as the tank wall 802 but oriented 180 degrees off the perpendicular from the BDC of the tank. This effect is active only in the radial orientation of the tank. A convergent acoustic lens may be used to increase the ultrasonic flux density and provide a stronger echo signal. This has specific application where misalignment is not a concern.

In an alternative embodiment, the acoustic lens 808 may be shaped in a complex fashion such that not only is the wave front shaped in the radial axis of the tank, but the wavefront is also shaped in the longitudinal direction of the tank.

The acoustic lens 808 and the emitter 810 may be embodied with diameters and thicknesses of various sizes. In one embodiment, the acoustic lens 808 may have a diameter greater than the emitter 810. The emitter 810 may be coupled and centrally aligned with the acoustic lens 808 such that the acoustic lens 808 overhangs the emitter 810 along the periphery. With an acoustic lens diameter greater than the emitter diameter, the signal strength of the ultrasonic signal is increased.

A correlation exists between the wavelength of the ultrasonic signal passing through the acoustic lens 808 and the diameters of the acoustic lens 808 and the emitter 810. In one embodiment, the acoustic lens 808 has a diameter that is one wavelength greater than the diameter of the emitter 810. The one wavelength increase in diameter between the acoustic lens 808 and the emitter 810 provides a substantial increase in the signal strength.

Figure 9:
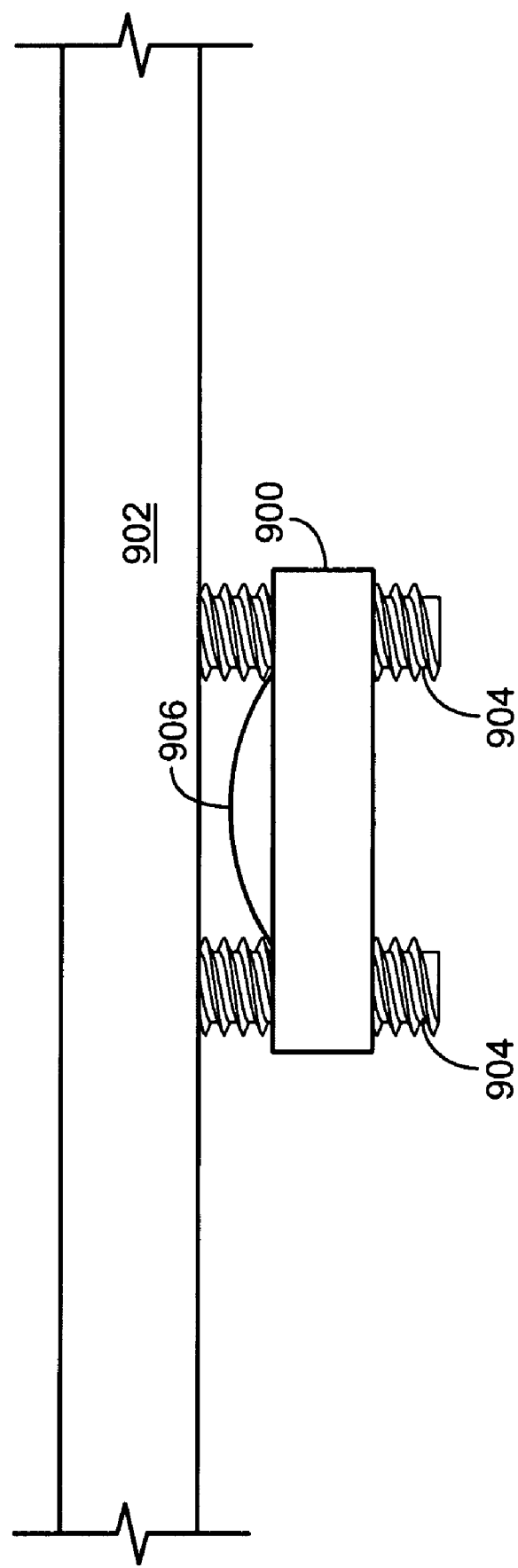
FIG. 9 illustrates a cross-sectional view of a transducer incorporating mounting magnets.

Referring to FIG. 9, an embodiment for mounting a transducer 900 to the tank wall 902 is shown. A plurality of mounting magnets 904 are shown coupled to the transducer 900. Each magnet 904 may be configured with threads, and the transducer 900 is configured with threaded apertures to receive a corresponding magnet. By screwing a magnet 904, the magnet 904 moves relative to the transducer 900.

Each magnet 904 extends through the transducer 900 and can contact the tank wall 902. Through magnetic coupling, the transducer 900 may be positioned relative to the tank wall 902. By screwing the magnets 904, the transducer 900 and the acoustic lens 906 may be positioned at a desired distance from the tank wall 902. Once a desired distance is achieved, a bonding material may be inserted between the transducer 900 and the tank wall 902 to secure the position. The desired distance between a transducer 900 and a tank wall 902 may be determined in a factory environment rather than in the field.

Figure 10:
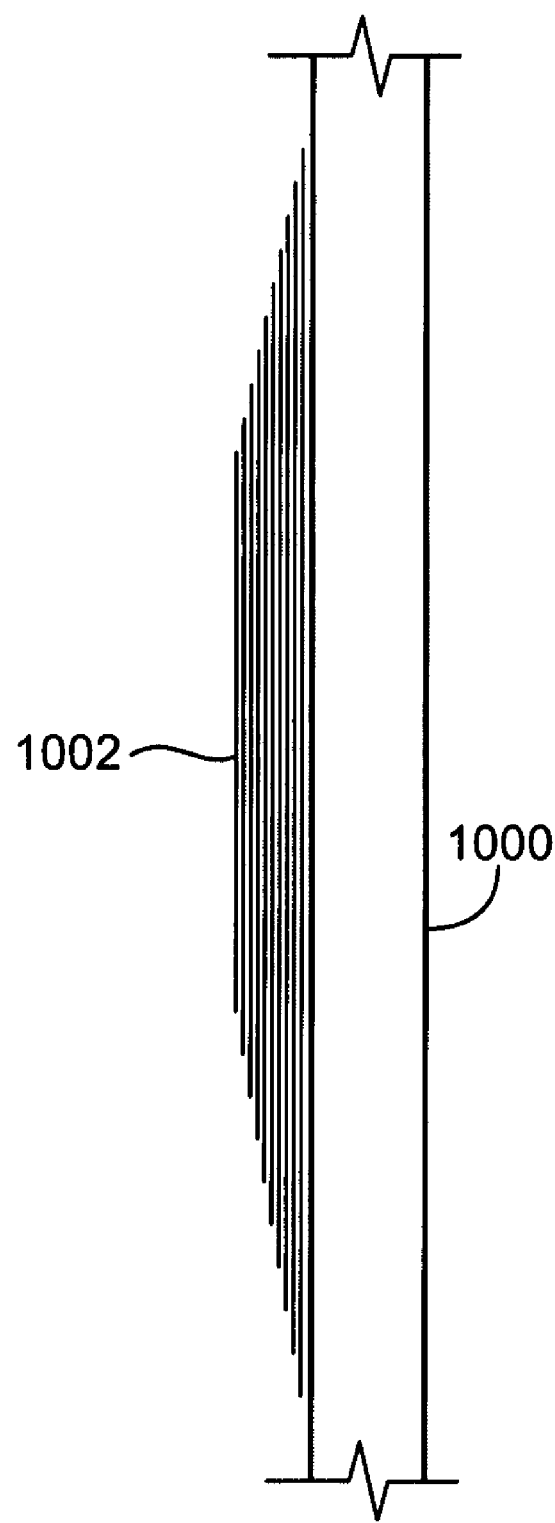
FIG. 10 illustrates a graphical representation of an initial ultrasonic wavefront and a flat tank wall.

The acoustic lens is configured to shape the wavefront of the ultrasonic beam and steer the ultrasonic beam. Referring to FIG. 10, a flat tank wall 1000 is shown with an initial ultrasonic wavefront 1002.

Figure 11:
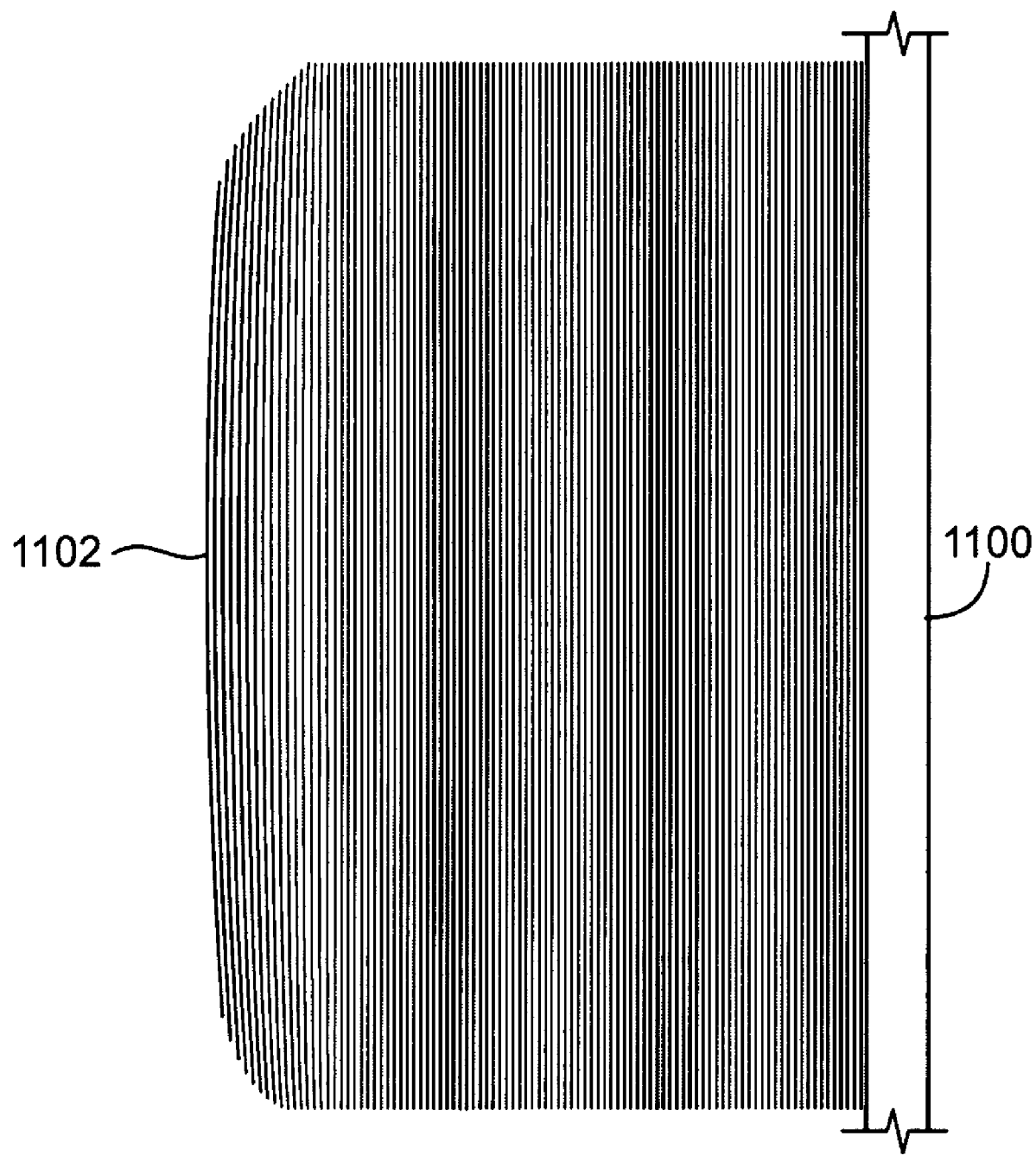
FIG. 11 illustrates a graphical representation of a fully developed ultrasonic wavefront and a flat tank wall.

Referring to FIG. 11, a flat tank wall 1100 is shown with a fully developed wavefront 1102. The wavefront is generally uniform and relatively flat. To reduce the likelihood of doubling, a uniform and flat wavefront is desired.

Figure 12:
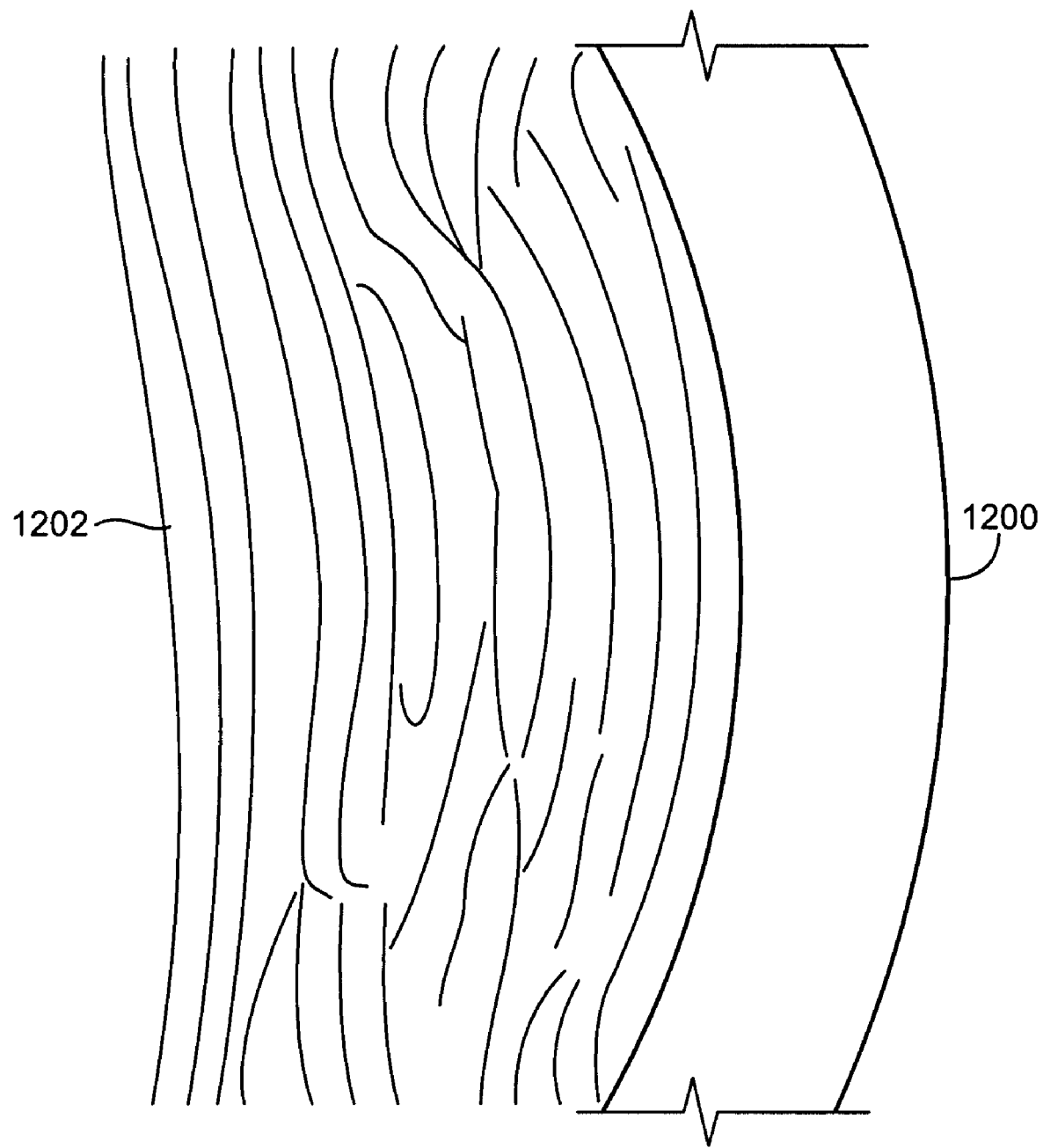
FIG. 12 illustrates a graphical representation of an initial ultrasonic wavefront and a radiused tank wall.

Referring to FIG. 12, a radiused tank wall 1200 is shown with an initial wavefront 1202. The wavefront is generated by an emitter offset from BDC 1204. As shown, the offset position of the emitter and the lensing effect of the tank wall produce a non-uniform wavefront 1202 that is not flat. The non-uniform wavefront 1202 will create an echo that may not return to an active area of an emitter.

Figure 13:
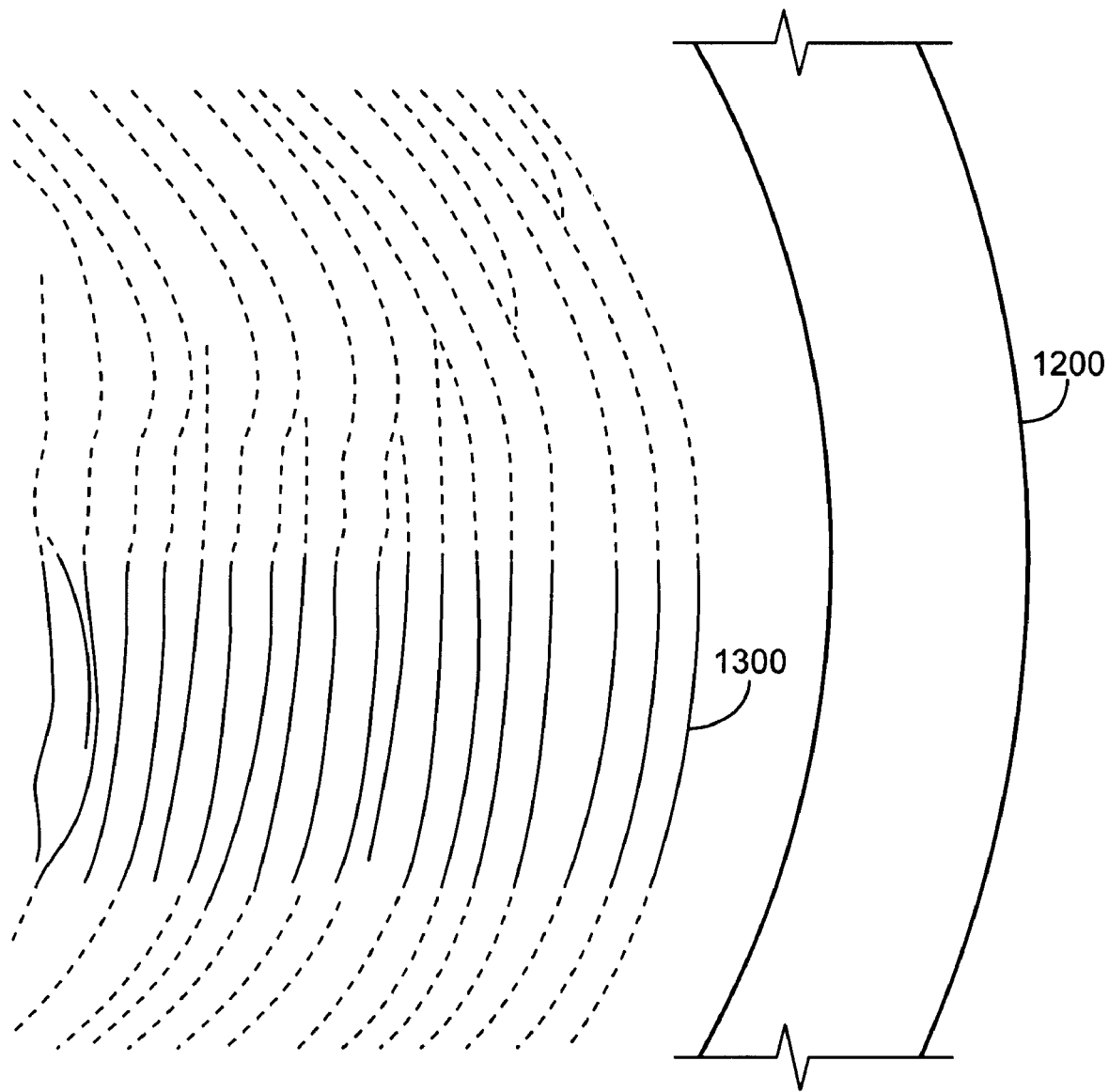
FIG. 13 illustrates a graphical representation of a first echo with the radiused tank wall of FIG. 12.

Referring to FIG. 13, the tank wall 1200 of FIG. 12 is shown with a first echo 1300 returning to the tank wall 1200. The first echo 1300 only proximately returns to the active area of the emitter. The primary strength of the first echo 1300 (shown in solid lines) may not impact the active area of the emitter. Rather, a reduced strength of the first echo 1300 (shown in dashed lines) may impact the active area of the emitter. This results in a reduced measurement of the first echo 1300, and the first echo 1300 may not be detected as an echo.

Figure 14:
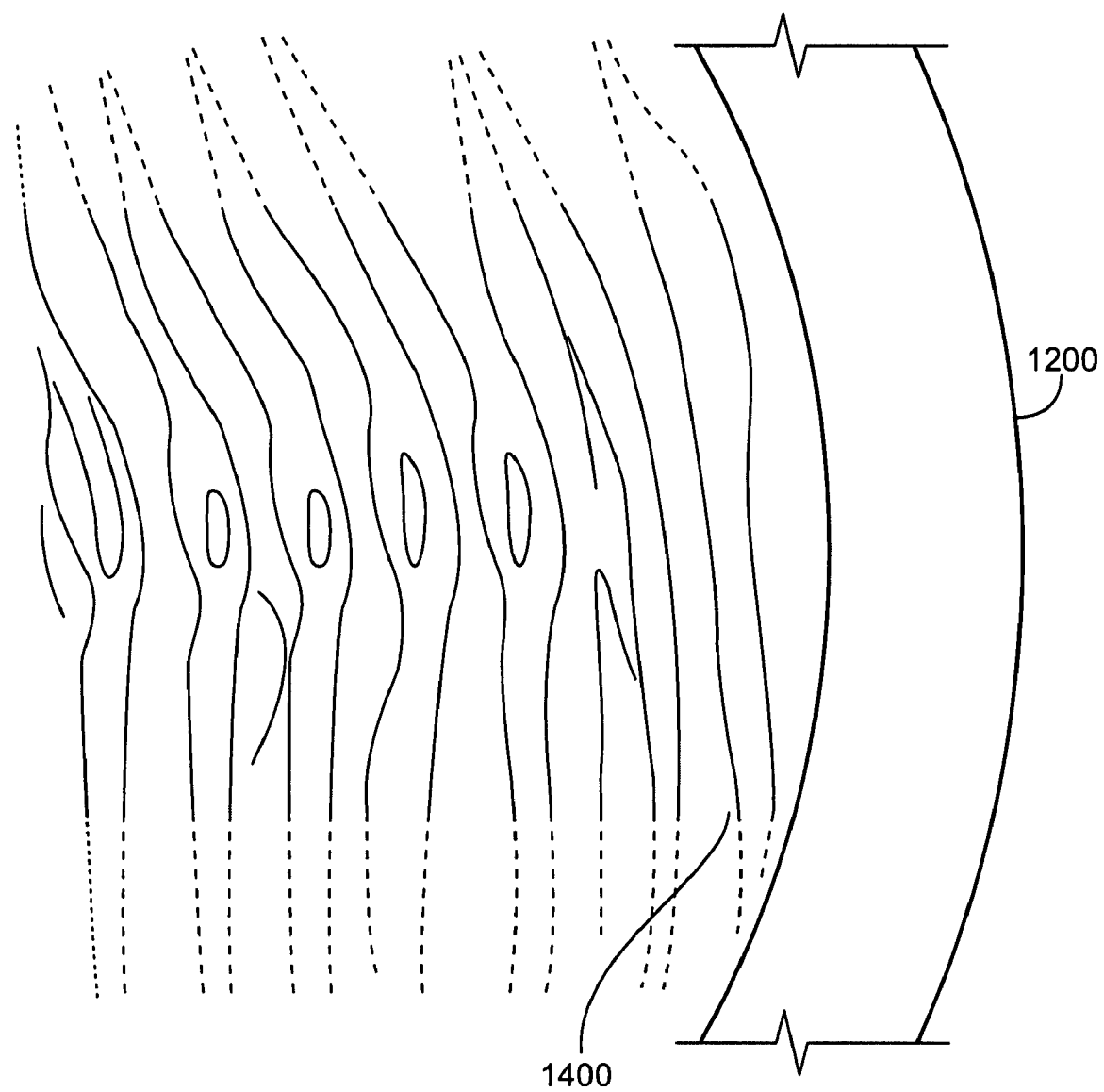
FIG. 14 illustrates a graphical representation of a second echo with the radiused tank wall of FIG. 12.

Referring to FIG. 14, the tank wall 1200 of FIG. 13 is shown with a second echo 1400 returning to the tank wall 1200. The second echo 1400 returns squarely to the active area of the emitter and may be falsely detected as the first echo.

Figure 15:
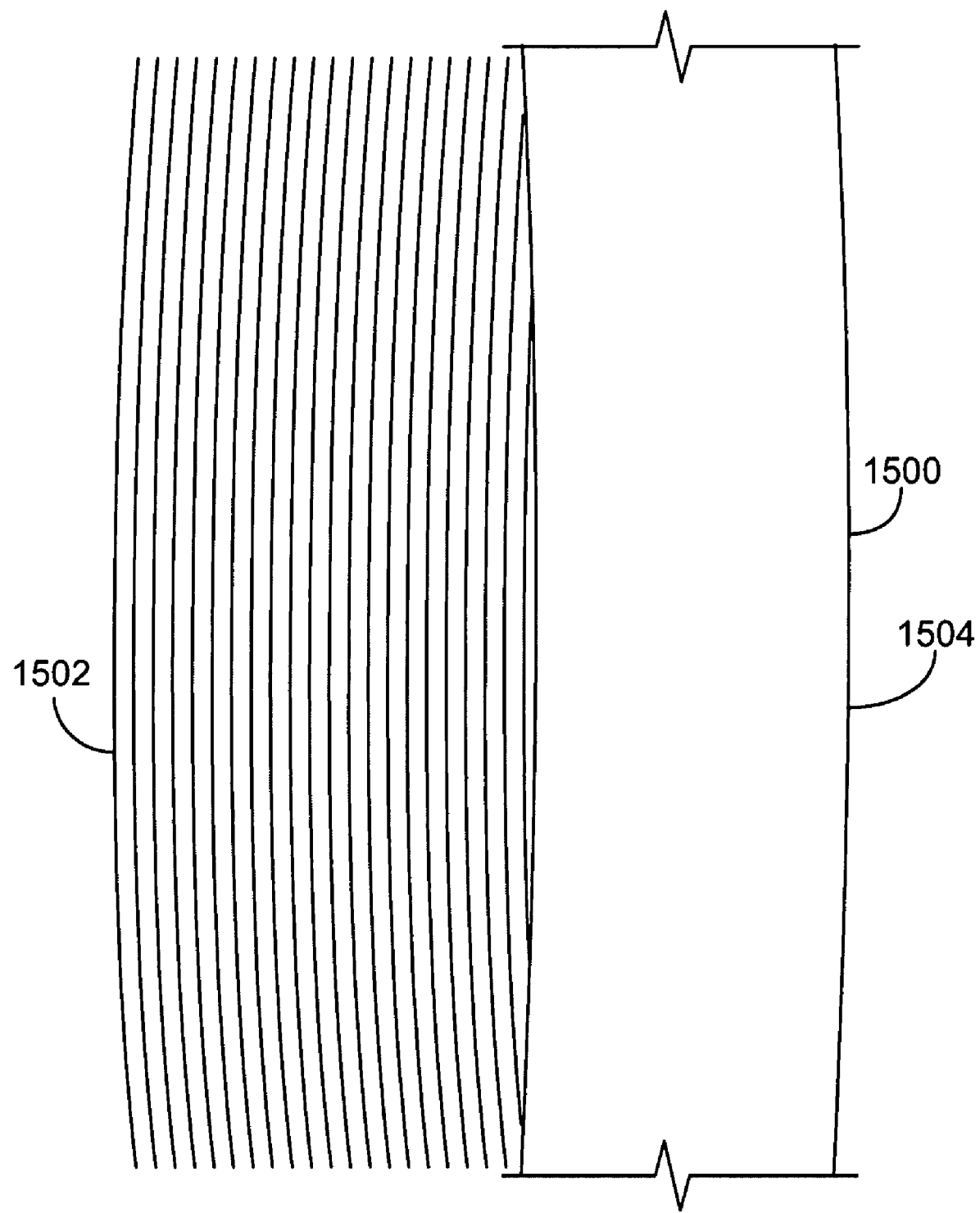
FIG. 15 illustrates a graphical representation of an initial ultrasonic wavefront with a radiused tank wall.

Referring to FIG. 15, a radiused tank wall 1500 is shown with an initial wavefront 1502 that is generated by an emitter offset from BDC 1504. However, the wavefront 1502 also passes through an acoustic lens to correct the alignment of the beam. Accordingly, the wavefront 1502 is generally flat and uniform. Thus aligned, the first echo will return to the active area of the emitter and will be detected.

Figure 16:
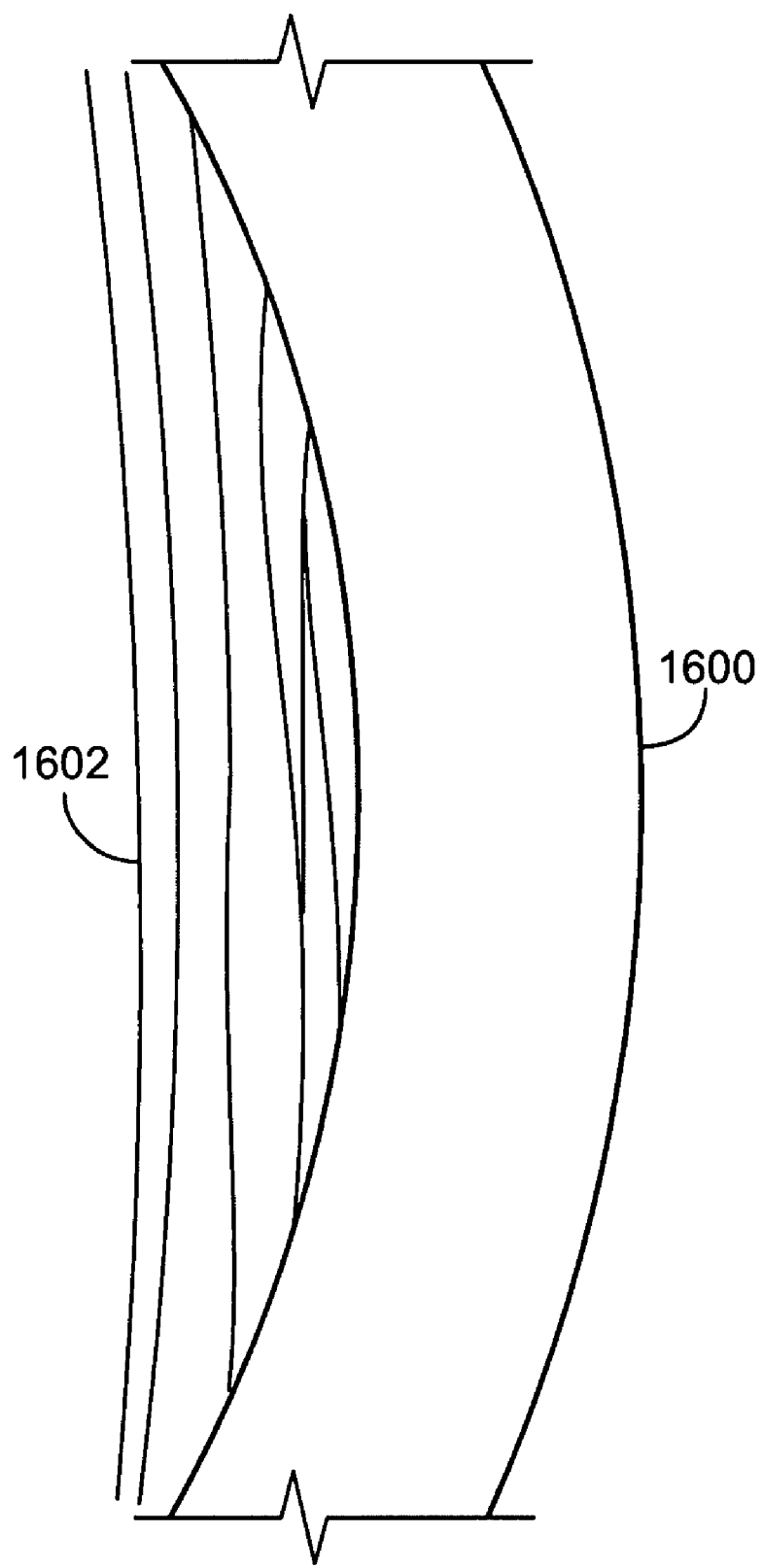
FIG. 16 illustrates a graphical representation of an initial ultrasonic wavefront with a radiused tank wall.

Referring to FIG. 16, a highly radiused tank wall 1600 is shown with an initial wavefront 1602 that is generated by an offset emitter. The wavefront 1602 passes through an acoustic lens and is shaped and aligned to be relatively flat and uniform.

Figure 17:
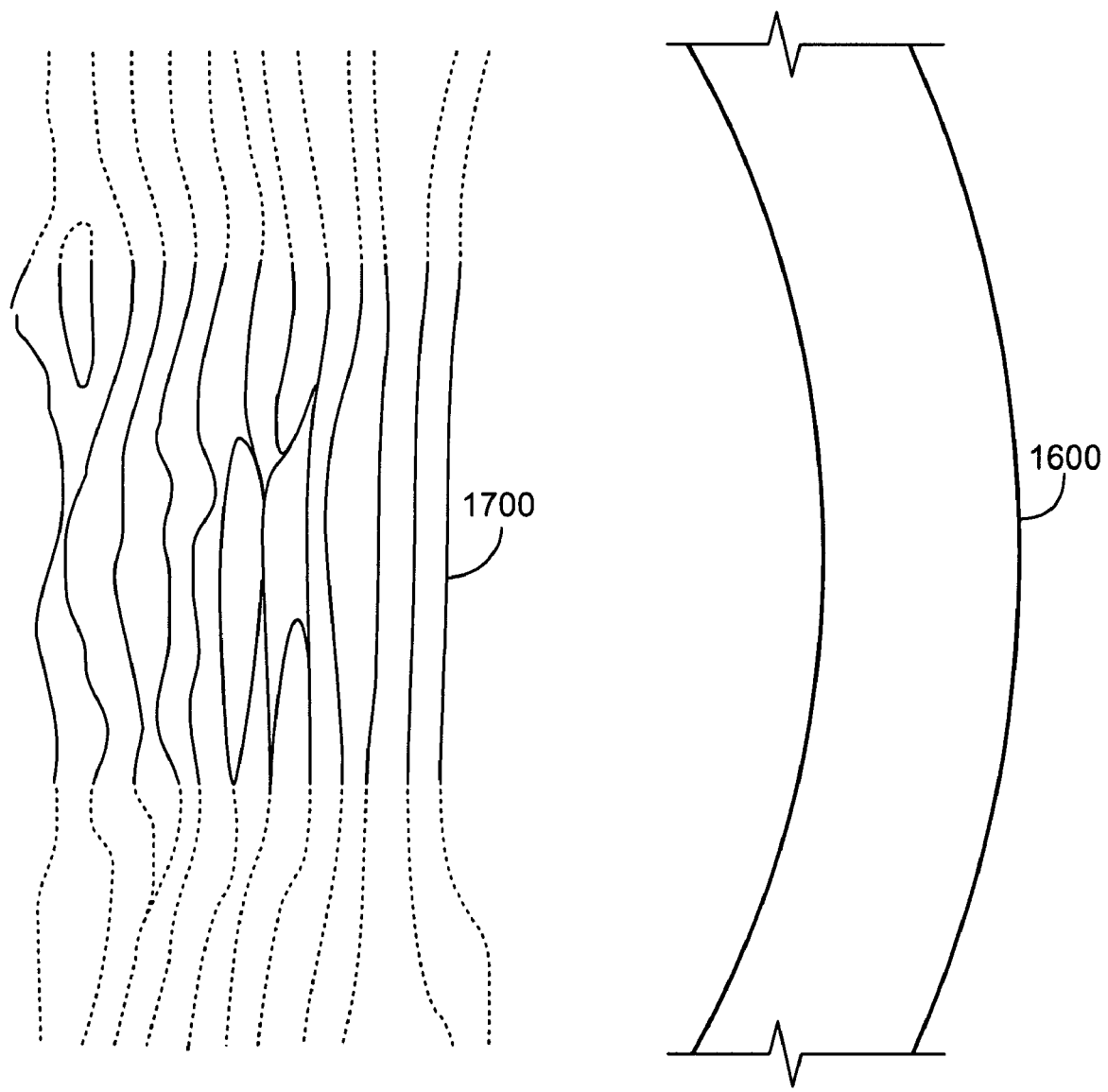
FIG. 17 illustrates a graphical representation of an echo with the tank wall of FIG. 16.

Referring to FIG. 17, the tank wall 1600 of FIG. 16 is shown with a first echo 1700 in transit. The first echo 1700 is directed to the active area of the emitter and will be detected.

Figure 18:
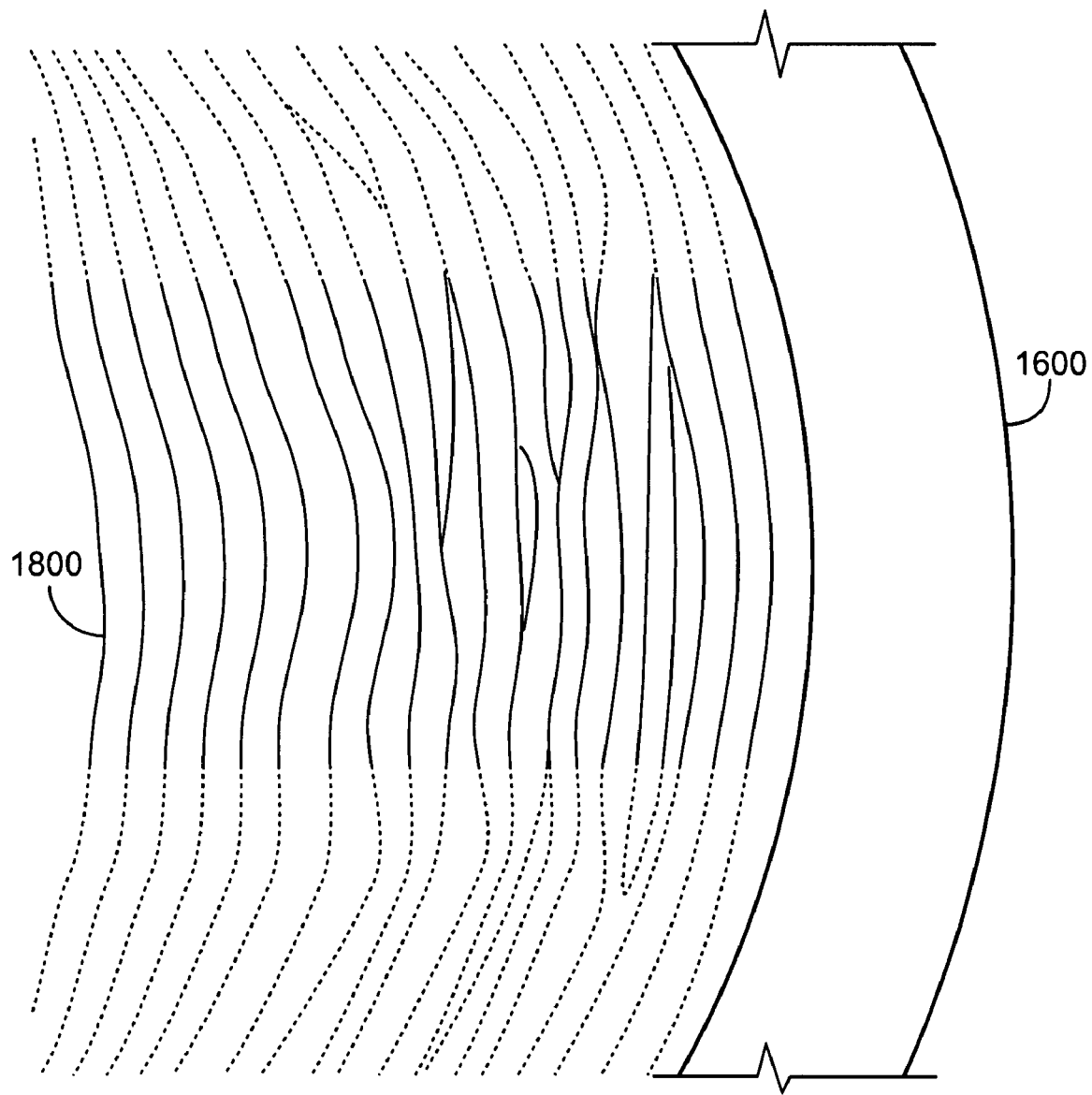
FIG. 18 illustrates a graphical representation of a second echo with the tank wall of FIG. 16.

Referring to FIG. 18, that tank wall 1600 of FIG. 16 is shown with a second echo 1800 being received in an active area of the emitter. The second echo 1800 is exponentially less than the first echo and will not be detected as the first echo.

The disclosed acoustic lens shapes and aligns an ultrasonic beam, as well as adjusts the flux density. It will be obvious to those having skill in the art that many changes may be made to the details of the above-described embodiments without departing from the underlying principles of the invention. The scope of the present invention should, therefore, be determined only by the following claims.

The invention claimed is:

1. An ultrasonic transducer unit mountable to a tank and to measure a liquid level in a tank, comprising:
   an emitter to generate an ultrasonic beam to pass through a tank wall and to receive an echo of the ultrasonic beam off a liquid surface;
   a transducer driver in electrical communication with the emitter;
   an acoustic lens coupled to the emitter and configured to shape the ultrasonic beam and configured to diverge the ultrasonic beam and thereby provide a divergent ultrasonic beam after the ultrasonic beam passes through a tank wall;
   wherein the acoustic lens includes a diameter greater than a diameter of the emitter; and
   wherein the diameter of the acoustic lens is approximately one wavelength of the ultrasonic signal passing through the acoustic lens greater than the diameter of the emitter.

2. An ultrasonic transducer unit mountable to a tank and to measure a liquid level in the tank, comprising:
   an emitter to generate an ultrasonic beam to pass through a tank wall and to receive an echo of the ultrasonic beam off a liquid surface;

a transducer driver in electrical communication with the emitter; and an acoustic lens coupled to the emitter to receive the ultrasonic beam and configured to diverge the ultrasonic beam and thereby compensate for a converging effect of the tank wall, such that the resulting wavefront of the ultrasonic beam is substantially parallel to the liquid surface.

3. The ultrasonic transducer unit of claim 2, wherein a wavefront that is substantially parallel to the liquid surface comprises a wavefront with a divergence of approximately zero to five degrees after the beam passes through a tank wall.

4. The ultrasonic transducer of claim 2, wherein the acoustic lens is concave.

5. The ultrasonic transducer of claim 2, wherein the acoustic lens is convex.

6. The ultrasonic transducer of claim 2, wherein the acoustic lens is coupled to the emitter with a bonding material.

7. The ultrasonic transducer of claim 2, further comprising a plurality of mounting magnets rotatably threaded into the transducer and extending from the transducer, wherein rotation of the mounting magnets determines the extension from the transducer.

8. The ultrasonic transducer of claim 2, wherein the emitter comprises a piezoelectric crystal transducer.

9. The ultrasonic transducer of claim 2, wherein the acoustic lens comprises metal.

10. The ultrasonic transducer of claim 2, wherein the acoustic lens comprises aluminum.

11. The ultrasonic transducer of claim 2, wherein the acoustic lens includes a diameter greater than a diameter of the emitter.

12. The ultrasonic transducer of claim 2, wherein the diameter of the acoustic lens is approximately one wavelength of the ultrasonic signal passing through the acoustic lens greater than the diameter of the emitter.

* * * * *